United States Patent
Jung et al.

(10) Patent No.: US 9,342,564 B2
(45) Date of Patent: May 17, 2016

(54) DISTRIBUTED PROCESSING APPARATUS AND METHOD FOR PROCESSING LARGE DATA THROUGH HARDWARE ACCELERATION

(75) Inventors: Myung-June Jung, Suwon-si (KR); Ju-Pyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 839 days.

(21) Appl. No.: 13/590,805

(22) Filed: Aug. 21, 2012

(65) Prior Publication Data

US 2013/0227227 A1 Aug. 29, 2013

(30) Foreign Application Priority Data

Feb. 27, 2012 (KR) .................. 10-2012-0019708

(51) Int. Cl.
*G06F 15/76* (2006.01)
*G06F 7/38* (2006.01)
*G06F 17/30* (2006.01)

(52) U.S. Cl.
CPC ................. *G06F 17/30545* (2013.01)

(58) Field of Classification Search
CPC .................. G06F 17/30545; G06F 3/067
See application file for complete search history.

(56) References Cited

U.S. PATENT DOCUMENTS

| | | | |
|---|---|---|---|
| 8,510,538 B1* | 8/2013 | Malewicz | G06F 7/38 712/220 |
| 9,071,341 B2* | 6/2015 | Neff | H04B 1/7073 |
| 9,147,373 B2* | 9/2015 | Cunningham | G09G 5/00 |
| 2001/0041012 A1* | 11/2001 | Hsieh et al. | 382/234 |
| 2011/0154339 A1 | 6/2011 | Lee et al. | |
| 2011/0179100 A1 | 7/2011 | Kawai | |
| 2012/0078951 A1* | 3/2012 | Hsu et al. | 707/769 |
| 2013/0132684 A1* | 5/2013 | Ostrovsky et al. | 711/147 |
| 2013/0219394 A1* | 8/2013 | Goldman et al. | 718/100 |

FOREIGN PATENT DOCUMENTS

| | | |
|---|---|---|
| KR | 10-0946987 | 3/2010 |
| KR | 10-1013073 | 1/2011 |
| KR | 10-2011-0069338 | 6/2011 |

* cited by examiner

*Primary Examiner* — Hyun Nam
(74) *Attorney, Agent, or Firm* — Volentine & Whitt, PLLC

(57) ABSTRACT

A distributed data processing apparatus and method through hardware acceleration are provided. The data processing apparatus includes a mapping node including mapping units configured to process input data in parallel to generate and output mapping results. The data processing apparatus further includes a shuffle node including shuffle units and a memory buffer, the shuffle units configured to process the mapping results output from the mapping units in parallel to generate and output shuffle results, and the shuffle node configured to write the shuffle results output from the shuffle units in the memory buffer. The data processing apparatus further includes a merge node including merge units configured to merge the shuffle results written in the memory buffer to generate merging results.

14 Claims, 6 Drawing Sheets

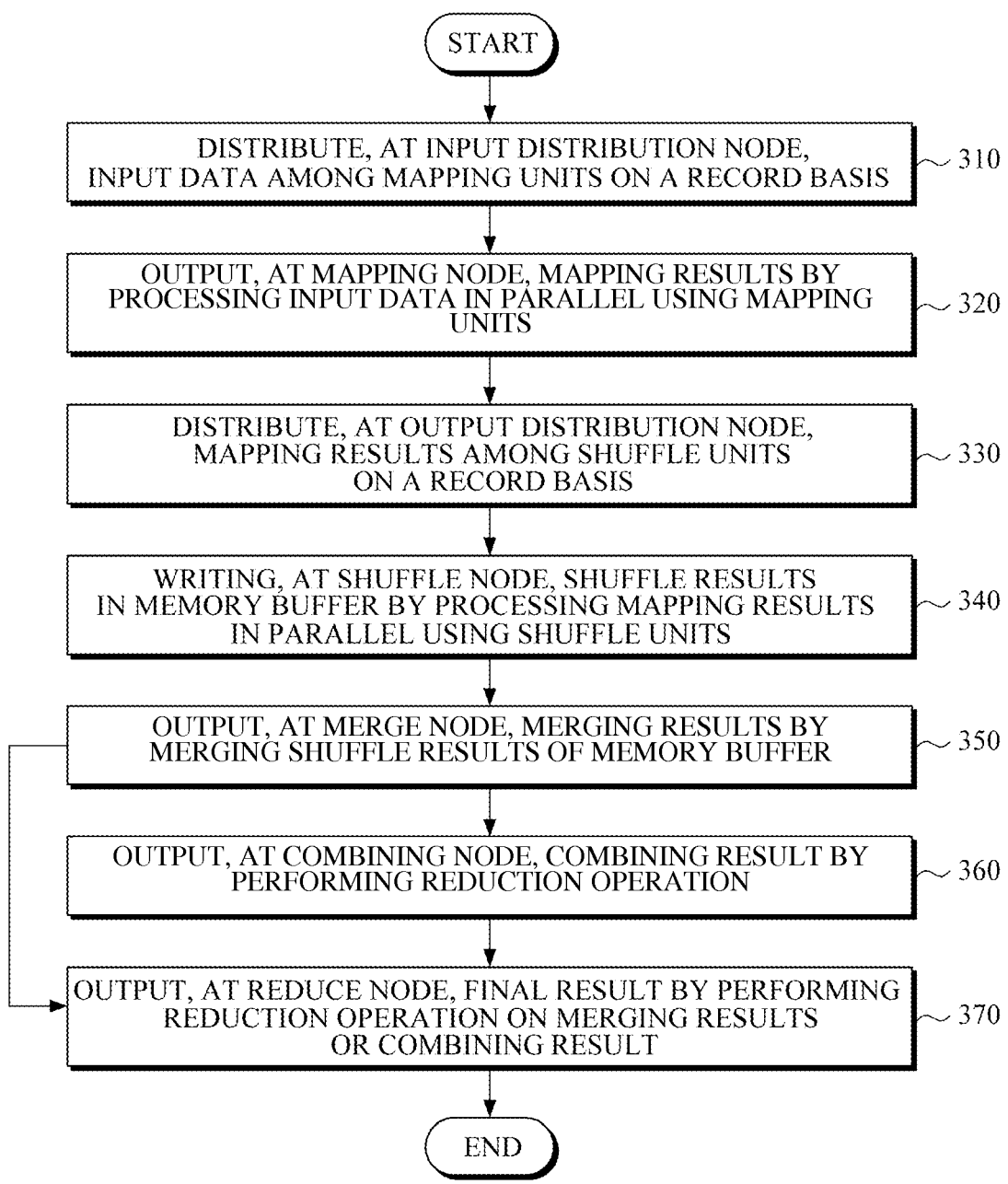

DISTRIBUTED PROCESSING APPARATUS AND METHOD FOR PROCESSING LARGE DATA THROUGH HARDWARE ACCELERATION

CROSS-REFERENCE TO RELATED APPLICATION(S)

This application claims the benefit under 35 U.S.C. §119 (a) of Korean Patent Application No. 10-2012-0019708, filed on Feb. 27, 2012, in the Korean Intellectual Property Office, the entire disclosure of which is incorporated herein by reference for all purposes.

BACKGROUND

1. Field

The following description relates to a distributed data processing apparatus and method through hardware acceleration.

2. Description of the Related Art

With the increasing development of Internet technology, a larger amount of data has been created and distributed over the Internet. In such an environment where a large amount of data is available for use, a variety of companies, for example, portal companies, raise their competitiveness by accumulating a massive amount of data, and extracting and providing significant information to a user on request. Accordingly, various research has been conducted on establishing a large-scale cluster at a reduced cost to enable disturbed data processing and distributed data parallel processing.

A distributed parallel processing programming model supports distributed parallel computation of a large amount of data stored in a cluster that is formed of a large number of nodes at a low cost. The distributed parallel processing programming model includes two steps: a "Map step" based on a map function made by a user and a "Reduce step" based on a reduce function. These two steps are performed in turn. However, as the amount of data to be processed increases, reduction of data analysis time to improve performance is more difficult.

SUMMARY

In one general aspect, there is provided a data processing apparatus including a mapping node including mapping units configured to process input data in parallel to generate and output mapping results. The data processing apparatus further includes a shuffle node including shuffle units and a memory buffer, the shuffle units configured to process the mapping results output from the mapping units in parallel to generate and output shuffle results, and the shuffle node configured to write the shuffle results output from the shuffle units in the memory buffer. The data processing apparatus further includes a merge node including merge units configured to merge the shuffle results written in the memory buffer to generate merging results.

The data processing apparatus may further include an input distribution node configured to distribute the input data among the mapping units on a record-by-record basis.

A number of the mapping units may be determined based on a unit time taken by the input distribution node to input a record of the input data into one of the mapping units, or a unit time taken by the one of the mapping units to process the record, or any combination thereof.

The data processing apparatus may further include an output distribution node configured to combine the mapping results output from the mapping units into a piece of data, and distribute the piece of data among the shuffle units on a record-by-record basis.

A number of shuffle units may be determined based on a unit time taken by the output distribution node to input a record of the input data into one of the shuffle units, or a unit time taken by the one of the shuffle units to process the record, or any combination thereof.

The memory buffer may include a matrix of memory section rows and memory section columns.

The shuffle units may correspond to the memory section rows, respectively. The shuffle node may be further configured to write the shuffle results output from the respective shuffle units in the corresponding memory section rows.

The merge units may correspond to the memory section columns, respectively. The merge units may be further configured to merge the respective shuffle results written in the corresponding memory section columns to generate the merging results.

The data processing apparatus may further include a combining node configured to perform a reduction operation on the merging results to generate and output a combining result, the merging results being output from the merge units.

The data processing apparatus may further include a reduce node configured to perform a reduction operation on the merging results output from the merge units or the combining result output from the combining node to generate a reduce result.

The data processing apparatus may be implemented through hardware acceleration on a field programmable gate array.

In another general aspect, there is provided a data processing method including processing input data in parallel to generate mapping results. The data processing method further includes processing the mapping results in parallel to generate shuffle results. The data processing method further includes writing the shuffle results in a memory buffer. The data processing method further includes merging the shuffle results written in the memory buffer to generate merging results.

The data processing method may further include distributing the input data to mapping units on a record-by-record basis.

The data processing method may further include determining a number of the mapping units based on a unit time taken to input a record of the input data into one of the mapping units, or a unit time taken by the one of the mapping units to process the record, or any combination thereof.

The data processing method may further include combining the mapping results into a piece of data. The data processing method may further include distributing the piece of data among shuffle units on a record-by-record basis.

The memory buffer may include a matrix of memory section rows and memory section columns.

Shuffle units may correspond to the memory section rows, respectively. The writing of the shuffle results may include writing the shuffle results output from the respective shuffle units in the corresponding memory section rows.

Merge units may correspond to the memory section columns, respectively. The merging of the shuffle results may include merging the respective shuffle results written in the corresponding memory section columns to generate the merging results.

The data processing method may further include performing a reduction operation on the merging results to generate a combining result.

The data processing method may further include performing a reduction operation on the merging results or the combining result to generate a reduce result.

The data processing method may be implemented through hardware acceleration on a field programmable gate array.

Other features and aspects may be apparent from the following detailed description, the drawings, and the claims.

BRIEF DESCRIPTION OF THE DRAWINGS

FIG. 5 is a flowchart illustrating an example of a distributed data processing method.

Figure 1:
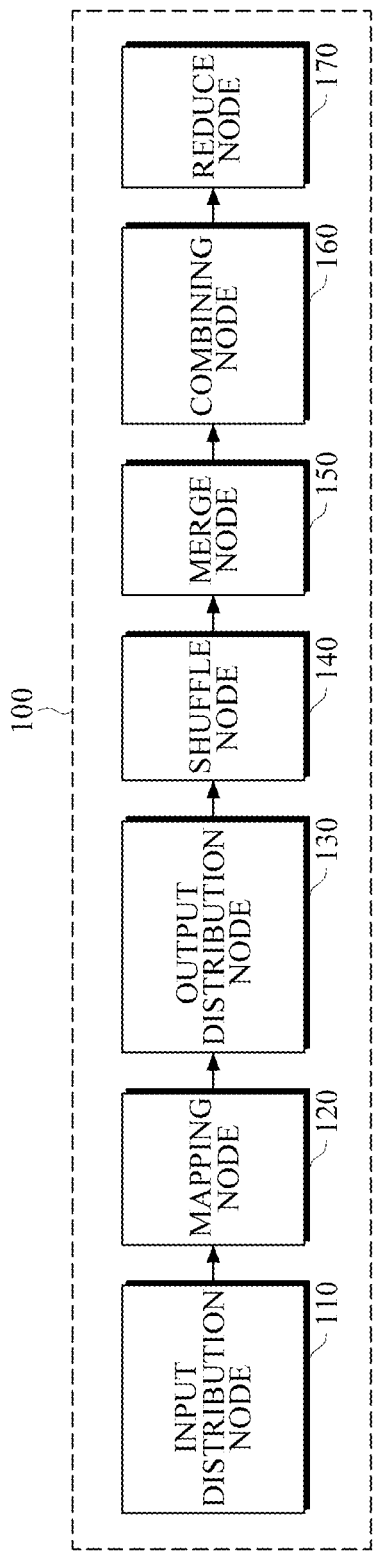
FIG. 1 is a block diagram illustrating an example of a distributed data processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a distributed data processing apparatus. A distributed data processing apparatus 100 may be implemented through, for example, hardware acceleration on a field programmable gate array (FPGA) to improve distributed data processing performance. The distributed data processing apparatus 100 may be configured to include all worker nodes disposed within a single FPGA chip, and may be configured to include some worker nodes disposed on a separate FPGA chip.

The distributed data processing apparatus 100 includes at least one mapping node 120, at least one shuffle node 140, and at least one merge node 150. Inter-node parallelization is performed using these nodes. In addition, each of the mapping node 120, the shuffle node 140, and the merge node 150 includes one or more sub-units, and the sub-units may be implemented on an FPGA chip.

Intra-node parallelization is enabled to be performed using the sub-units, to realize distributed data processing at a speed equivalent to a wire-speed. The wire-speed is an amount of data being read per unit time by each node configured to process data, regardless of a network or a local file system. For example, if a node can read input data of 1 gigabyte (GByte) per second, and a length of one record is 1 kilobyte (Kbyte), the node can process one million records per second, and this processing speed of the node can be defined as the wire speed.

Figure 2:
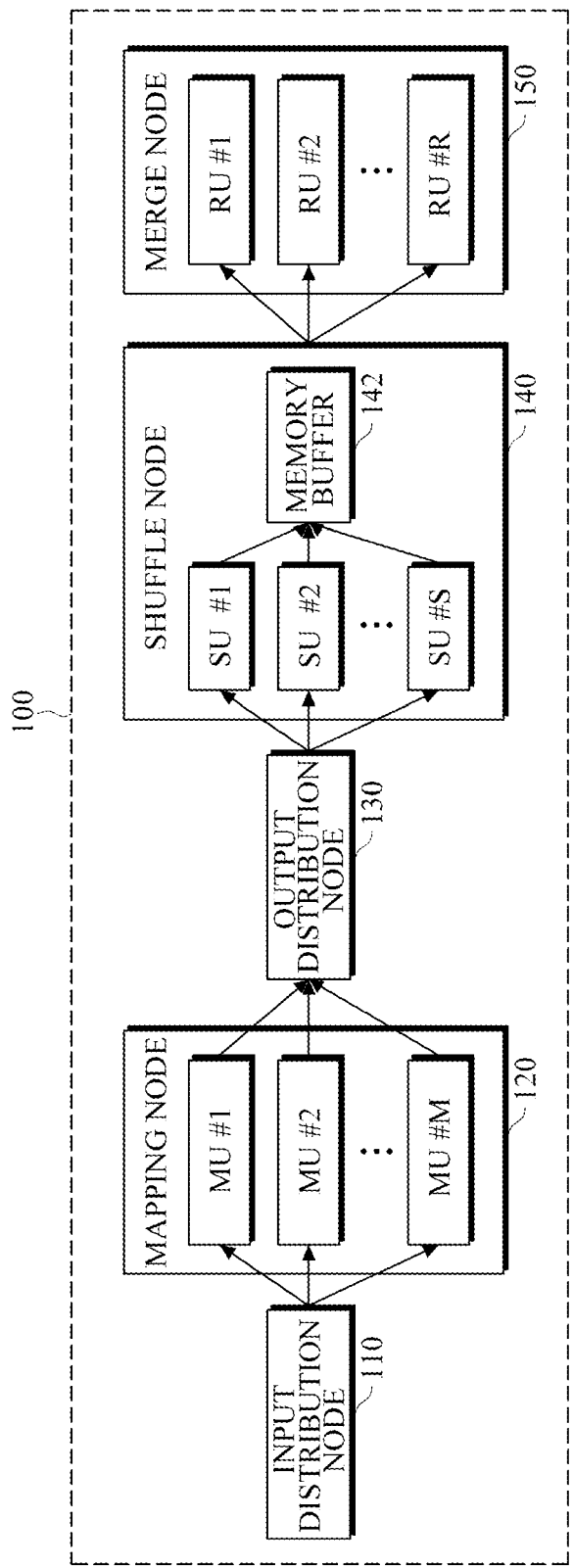
FIG. 2 is a block diagram illustrating an example in detail of the distributed data processing apparatus shown in FIG. 1.

FIG. 2 illustrates an example in detail of the distributed data processing apparatus 100 shown in FIG. 1. Referring to FIGS. 1 and 2, the distributed data processing apparatus 100 further includes an input distribution node 110 configured to distribute input data to the mapping node 120, and an output distribution node 130 configured to distribute one or more mapping results output from the mapping node 120 to the shuffle node 140. The mapping node 120 includes mapping units, for example, MU #1 to MU #M, configured to process the input data to generate the mapping results. The shuffle node 140 includes shuffle units, for example, SU #1 to SU #S, configured to process the mapping results to generate one or more shuffle results. The merge node 150 includes merge units, for example, RU #1 to RU #R, configured to process the shuffle results to generate one or more merging results.

The input distribution node 110 equally distributes the input data among the mapping units MU #1 to MU #M on a record-by-record basis. Each of the output mapping results may be in the form of a key-value pair. The number M of the mapping units MU #1 to MU #M may be determined based on a resource status of given hardware (for example, a FPGA chip), to allow the input data to be processed at a speed equivalent to the wire speed, as given in the following equation:

$$M = T_M/T_1 \quad (1)$$

In Equation 1, $T_1$ denotes a unit time taken by the input distribution node 110 to input a record into a mapping unit, and $T_M$ denotes a unit time taken by the mapping unit to process the record. For example, if the input distribution node 110 takes 1 second to input a record (of, for example, 1 Kbyte) into a mapping unit, and the mapping unit takes 5 seconds to process the record based on a resource status of the mapping node 120, five mapping units MU #1 to MU #5 are provided to process the input data in parallel at the wire speed.

The output distribution node 130 combines the mapping results output from the respective mapping units MU #1 to MU #M into a stream of the mapping results. The output distribution node 130 equally distributes the stream among the shuffle units SU #1 to SU #S on a record-by-record basis.

The shuffle node 140 further includes a memory buffer 142. The shuffle node 140 writes, in the memory buffer 142, the shuffle results generated by the shuffle units SU #1 to SU #S through parallel processing. The shuffle units SU #1 to SU #5 may include a partition unit (not shown) configured to distribute a received record among partitions of the memory buffer 142, and a sort unit (not shown) configured to sort a partition result written in the memory buffer 142.

The number S of the shuffle units SU #1 to SU #S may be determined in a similar manner as determining the number M of the mapping units MU #1 to MU #M, as given in the following equation:

$$S = T_S/T_O \quad (2)$$

In Equation (2), $T_O$ denotes a unit time taken by the output distribution node 130 to input a record into a shuffle unit, and $T_S$ denotes a unit time taken by the shuffle unit to process the record. Accordingly, a processing speed of the shuffle unit varies with a resource status of the shuffle node 140, and the number S of the shuffle units SU #1 to SU #S is determined based on the resource status of the shuffle node 140, thereby enabling adaptive data parallel processing.

The merge node 150 merges contents (e.g., the shuffle results) distributed from the memory buffer 142 using the merge units RU #1 to RU #R, to generate and output the merging results. The merge units RU #1 to RU #R may merge the corresponding partitions of the memory buffer 142.

Referring again to FIG. 1, the distributed data processing apparatus 100 further includes a combining node 160 and a reduce node 170. The combining node 160 may perform, in advance, a processing operation, which is supposed to be performed by the reduce node 170. For example, the combining node 160 may perform a reduction operation on the merging results output from the merge node 150 that, for example, removes duplicate data from the merging results, to generate and output an intermediate combination (or combining) result. That is, the combining node 160 may reduce a workload of the reduce node 170.

The reduce node 170 performs a reduction operation that, for example, removes duplicate data from the merging results output from the merge node 150 or from the intermediate combination result output from the combining node 160. The reduce node 170 merges results of the reduction operation, to generate and output a final result, e.g., a reduce result.

Figure 3:
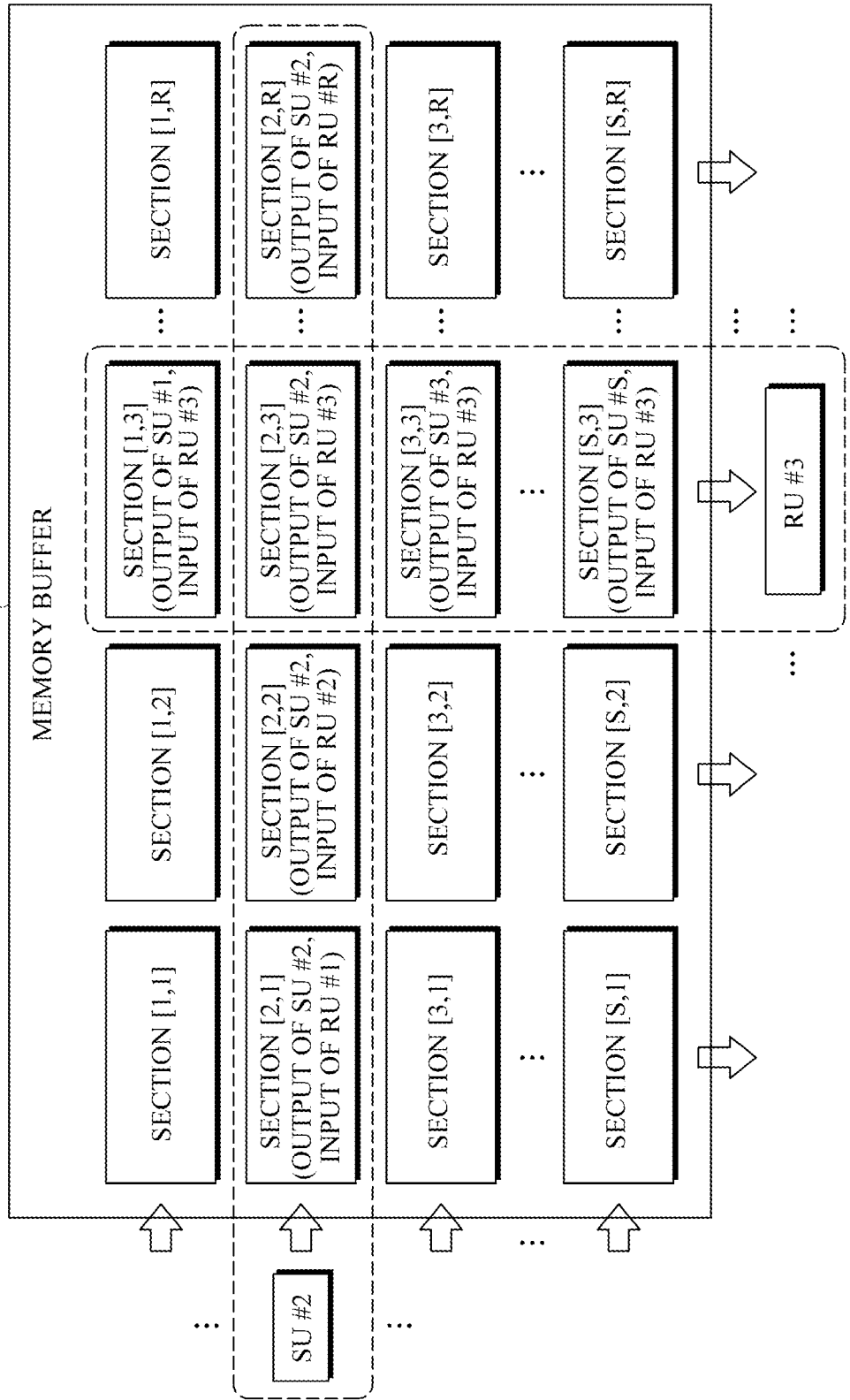
FIG. 3 is a block diagram illustrating an example of a memory buffer of the distributed data processing apparatus shown in FIG. 2.

FIG. 3 illustrates an example of a memory buffer of the distributed data processing apparatus shown in FIG. 2. Referring to FIG. 3, a memory buffer 142 is structured in a matrix including memory section rows corresponding to the shuffle units SU #1 to SU #S, and memory section columns corresponding to the merge units RU #1 to RU #R. Each memory section at an intersection of a memory section row and a memory section column is implemented to prevent the occurrence of memory arbitration bottleneck phenomenon if the merge units RU #1 to RU #R access a memory section.

In more detail, a memory section [i,j] indicates a j-th partition in which a shuffle result output from an i-th shuffle unit SU #i is written. Shuffle results written in j-th partitions (corresponding to memory section [1,j] to memory section [S,j]) are merged by a merge unit RU #j. For example, a shuffle result output from a second shuffle unit SU #2 is written in a memory section at a second row, and a memory section at a third column is read by (e.g., input into) a third merge unit RU #3.

Figure 4A:
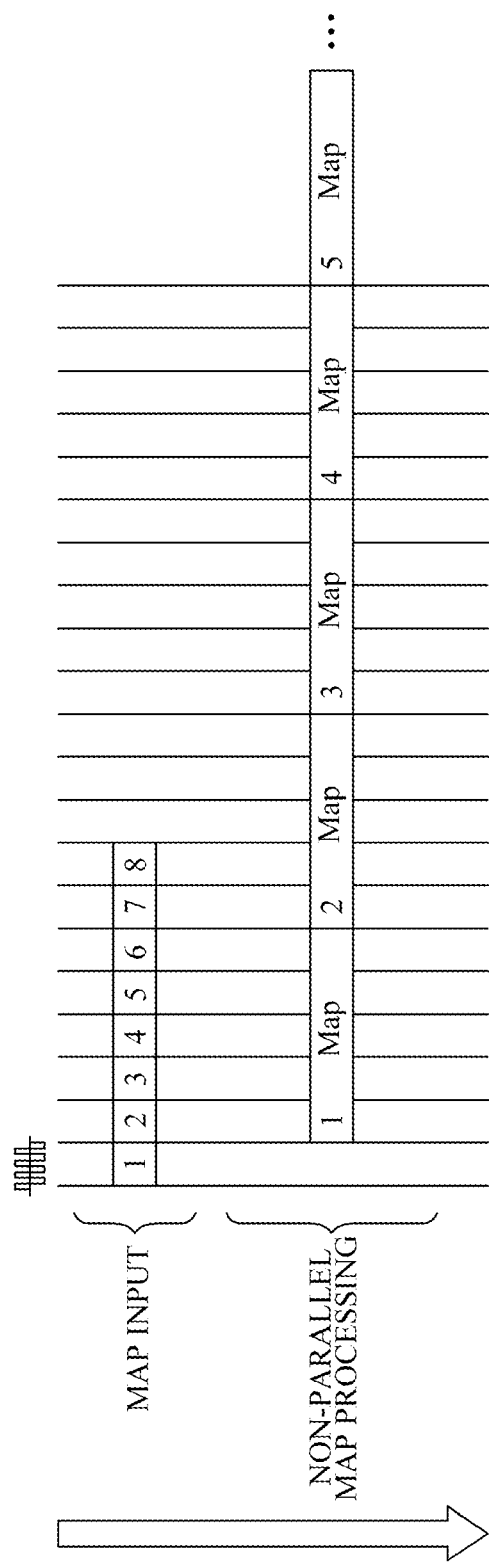
FIG. 4A is a diagram illustrating an example of a method of processing a mapping result.

FIG. 4A illustrates an example of a method of processing a mapping result. Referring to FIG. 4A, a worker node does not perform parallel processing, including executing a map task. Therefore, processing of a record (e.g., map input) should wait for processing of a previous record to complete. For example, as shown in FIG. 4A, if it takes one unit of time to input a record according to a resource status of a worker node, and it takes five units of time to process the record, processing of a second record is available after six units of time. Thus, there is a significant delay in processing speed.

Figure 4B:
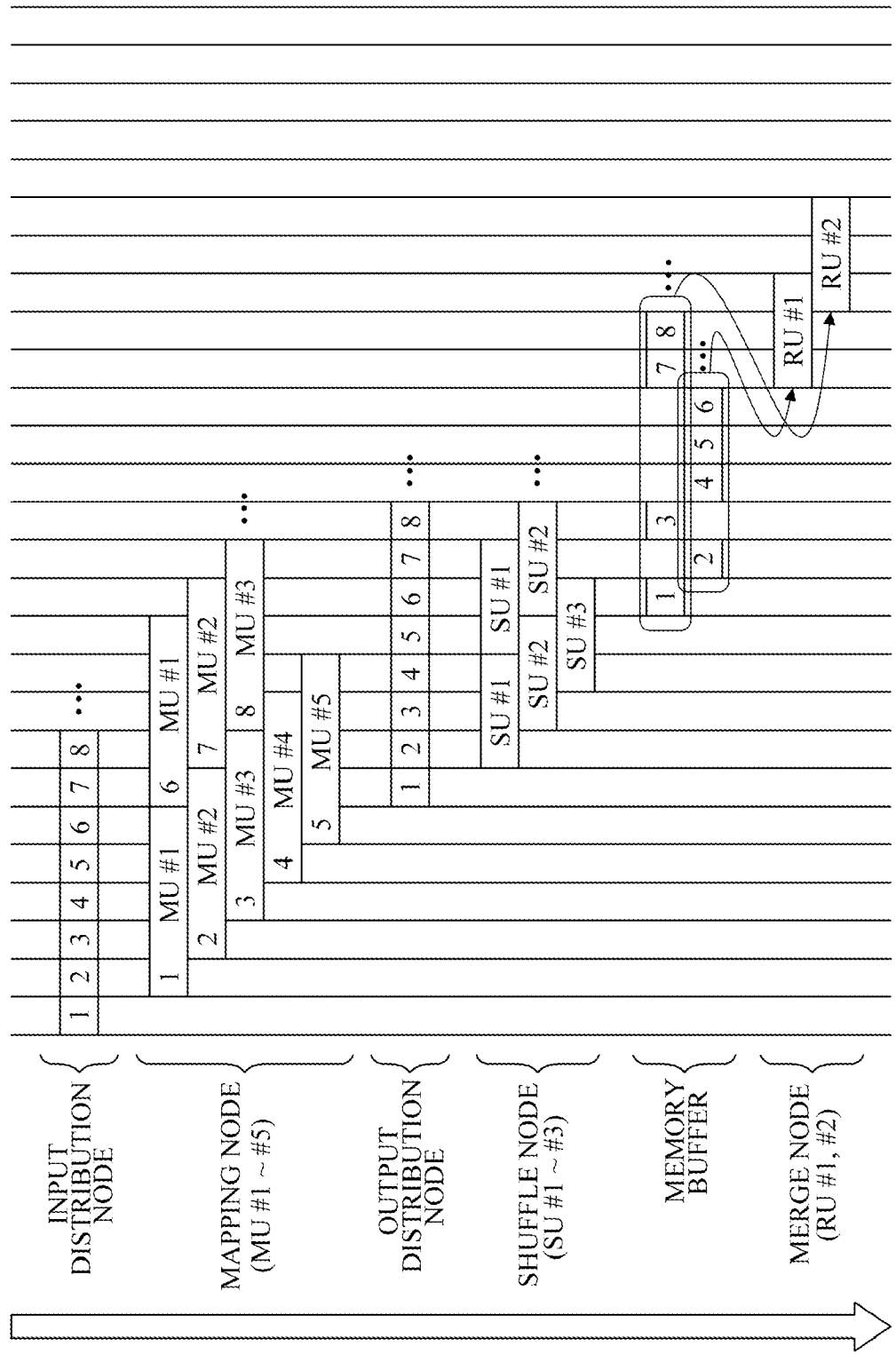
FIG. 4B is a diagram illustrating another example of a method of processing a mapping result.

FIG. 4B illustrates another example of a method of processing a mapping result. Referring to FIGS. 4B and FIG. 2, the mapping node 120 includes five mapping units MU #1 to MU #5, the shuffle node 140 includes three shuffle units SU #1 to SU #3, and the merge node 150 includes two merge units RU #1 and RU #2. In this example, like in FIG. 4A, it takes one unit of time for the input distribution node 110 to input a record, and it takes five units of time for a mapping unit to process the record. Thus, there are five mapping units, for example, MU #1 to MU #5. Likewise, because it takes one unit of time to input the record, and it takes three units of time for a shuffle unit to process the record, there are three shuffle units, for example, SU #1 to SU #3.

The input distribution node 110 distributes records 1 to 5 of input data sequentially among the mapping units MU #1 to MU #5, and distributes record 6 of the input data to the mapping unit MU #1 when the mapping unit MU #1 completes processing of record 1. In this manner, the mapping units MU #1 to MU #5 perform parallel processing of the input data to generate one or more mapping results, and hence, no delay occurs in processing each record of the input data.

The output distribution node 130 combines the mapping results output from the respective mapping units MU #1 to MU #5 into a stream of the mapping results, and distributes the stream sequentially among the shuffle units SU #1 to SU #3 on a record-by-record basis. The mapping results distributed to the shuffle units SU #1 to SU #3 are processed in parallel to generate one or more shuffle results, and the shuffle results output from the shuffle units SU #1 to SU #3 are written in the memory buffer 142. The merge units RU #1 and RU #2 merge the shuffle results written in the memory buffer 142 to generate one or more merging results. For example, the merge unit RU #1 merges shuffle results 1, 3, 7, and 8 written in the memory buffer 142, and the merge unit RU #2 merges shuffle results 2, 4, 5, and 6 written in the memory buffer 142.

FIG. 5 illustrates an example of a flowchart of a distributed data processing method. The distributed data processing method based on hardware acceleration may be implemented by the aforementioned apparatus and elements, and detailed descriptions of the apparatus and elements will not be reiterated.

Referring to FIGS. 2 and 5, in operation 310, the input distribution node 110 distributes input data among one or more mapping units (for example, MU #1 to MU #M) of the mapping node 120 on a record-by-record basis. The input distribution node 110 may equally distribute the input data among a plurality of the mapping units on a record-by-record basis such that the mapping node 120 processes the input data in parallel using the plurality of the mapping units.

In operation 320, the mapping node 120 outputs one or more mapping results generated by processing the input data in parallel using the mapping units to generate the mapping results. The mapping node 120 performs adaptive parallel processing to achieve a parallel processing performance at a constant speed equivalent to a wire speed regardless of a resource status of the mapping node 120. For example, the mapping node 120 is configured to include an number M of the mapping units based on the resource status of the mapping node 120. The number M of the mapping units may be determined by the above Equation 1 ($M=T_M/T_1$) in which a speed of processing a record according to the resource status of the mapping node 120 is taken into account.

In operation 330, the output distribution node 130 distributes a stream of the mapping results among one or more shuffle units (for example, SU #1 to SU #S) of the shuffle node 140 on a record-by-record basis. The output distribution node 130 combines the mapping results output from the mapping node 120 into the stream.

In operation 340, the shuffle node 140 writes one or more shuffle results in the memory buffer 142 by processing the mapping results in parallel using the shuffle units to generate the shuffle results. A number S of the shuffle units being included in the shuffle node 140 is determined based on a resource status of the shuffle node 140. As described above, the number S of the shuffle units may be determined by Equation 2 ($S=T_S/T_O$) considering the resource status of the shuffle node 140, and thereby, adaptive parallel processing is enabled.

In addition, for example, the memory buffer 142 may be structured in a matrix including memory section rows corresponding to the shuffle units, and memory section columns corresponding to one or more merge units (RU #1 to RU #R) in the merge node 150. In this example, each memory section at an intersection of a memory section row and a memory section column may be implemented to prevent the occurrence of memory arbitration bottleneck phenomenon if the merge units access a memory section.

In operation 350, the merge node 150 outputs one or more merging results by merging the shuffle results of memory sections in the memory buffer 142 using the merge units to generate the merging results. In optional operation 360, the combining node 160 outputs a combining result by performing an intermediate reduction operation that, for example, removes duplicate data from the merging results. The combining node 160 combines results of the intermediate reduction operation to generate the combining result. In this manner, a workload of the reduce node 170 may be reduced.

In operation 370, the reduce node 170 outputs a final result by performing a reduction operation that, for example, removes duplicate data from the merging results or the combining result. The reduce node 170 combines results of the reduction operation to generate the final result.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments to accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing apparatus comprising:
   a mapping node comprising mapping units configured to process input data in parallel to generate and output mapping results;
   a shuffle node comprising shuffle units and a memory buffer, the shuffle units configured to process the mapping results output from the mapping units in parallel to generate and output shuffle results, and the shuffle node configured to write the shuffle results output from the shuffle units in the memory buffer;
   a merge node comprising merge units configured to merge the shuffle results written in the memory buffer to generate merging results; and
   an input distribution node configured to distribute the input data among the mapping units on a record-by-record basis,
   wherein a number of the mapping units is determined based on a unit time taken by the input distribution node to input a record of the input data into one of the mapping units, or a unit time taken by the one of the mapping units to process the record, or any combination thereof.

2. The data processing apparatus of claim 1, further comprising:
   a combining node configured to perform a reduction operation on the merging results to generate and output a combining result, the merging results being output from the merge units.

3. The data processing apparatus of claim 2, further comprising:
   a reduce node configured to perform a reduction operation on the merging results output from the merge units or the combining result output from the combining node to generate a reduce result.

4. The data processing apparatus of claim 1, wherein the data processing apparatus is implemented through hardware acceleration on a field programmable gate array.

5. A data processing apparatus comprising:
   a mapping node comprising mapping units configured to process input data in parallel to generate and output mapping results;
   a shuffle node comprising shuffle units and a memory buffer, the shuffle units configured to process the mapping results output from the mapping units in parallel to generate and output shuffle results, and the shuffle node configured to write the shuffle results output from the shuffle units in the memory buffer;
   a merge node comprising merge units configured to merge the shuffle results written in the memory buffer to generate merging results; and
   an output distribution node configured to combine the mapping results output from the mapping units into a piece of data, and distribute the piece of data among the shuffle units on a record-by-record basis,
   wherein a number of the shuffle units is determined based on a unit time taken by the output distribution node to input a record of the piece of data into one of the shuffle units, or a unit time taken by the one of the shuffle units to process the record, or any combination thereof.

6. A data processing apparatus comprising:
a mapping node comprising mapping units configured to process input data in parallel to generate and output mapping results;
a shuffle node comprising shuffle units and a memory buffer, the shuffle units configured to process the mapping results output from the mapping units in parallel to generate and output shuffle results, and the shuffle node configured to write the shuffle results output from the shuffle units in the memory buffer; and
a merge node comprising merge units configured to merge the shuffle results written in the memory buffer to generate merging results,
wherein the memory buffer comprises a matrix of memory section rows and memory section columns, and
wherein the shuffle units correspond to the memory section rows, respectively, and the shuffle node is further configured to write the shuffle results output from the respective shuffle units in the corresponding memory section rows.

7. A data processing apparatus comprising:
a mapping node comprising mapping units configured to process input data in parallel to generate and output mapping results;
a shuffle node comprising shuffle units and a memory buffer, the shuffle units configured to process the mapping results output from the mapping units in parallel to generate and output shuffle results, and the shuffle node configured to write the shuffle results output from the shuffle units in the memory buffer; and
a merge node comprising merge units configured to merge the shuffle results written in the memory buffer to generate merging results,
wherein the memory buffer comprises a matrix of memory section rows and memory section columns, and
wherein the merge units correspond to the memory section columns, respectively, and the merge units are further configured to merge the respective shuffle results written in the corresponding memory section columns to generate the merging results.

8. A data processing method comprising:
processing input data in parallel to generate mapping results at a mapping node:
processing the mapping results in parallel to generate shuffle results at a shuffle node;
writing the shuffle results in a memory buffer;
merging the shuffle results written in the memory buffer to generate merging results;
distributing the input data to mapping units of the mapping node on a record-by-record basis; and
determining a number of the mapping units based on a unit time taken to input a record of the input data into one of the mapping units, or a unit time taken by the one of the mapping units to process the record, or any combination thereof.

9. The data processing method of claim 8, further comprising:
combining the mapping results into a piece of data; and
distributing the piece of data among shuffle units of the shuffle node on a record-by-record basis.

10. The data processing method of claim 8, further comprising:
performing a reduction operation on the merging results to generate a combining result.

11. The data processing method of claim 10, further comprising:
performing a reduction operation on the merging results or the combining result to generate a reduce result.

12. The data processing method of claim 8, wherein the data processing method is implemented through hardware acceleration on a field programmable gate array.

13. A data processing method comprising:
processing input data in parallel to generate mapping results;
processing the mapping results in parallel a shuffle node;
writing the shuffle results in a memory buffer; and
merging the shuffle results written in the memory buffer to generate merging results,
wherein the memory buffer comprises a matrix of memory section rows and memory section columns, and shuffle units of the shuffle node correspond to the memory section rows, respectively, and
wherein the writing of the shuffle results comprises writing the shuffle results output from the respective shuffle units in the corresponding memory section rows.

14. A data processing method comprising:
processing input data in parallel to generate mapping results;
processing the mapping results in parallel to generate shuffle results;
writing the shuffle results in a memory buffer; and
merging the shuffle results written in the memory buffer to generate merging results at a merge node,
wherein the memory buffer comprises a matrix of memory section rows and memory section columns, and merge units of the merge node correspond to the memory section columns, respectively, and
wherein the merging of the shuffle results comprises merging the respective shuffle results written in the corresponding memory section columns to generate the merging results.

* * * * *